Figure 1:
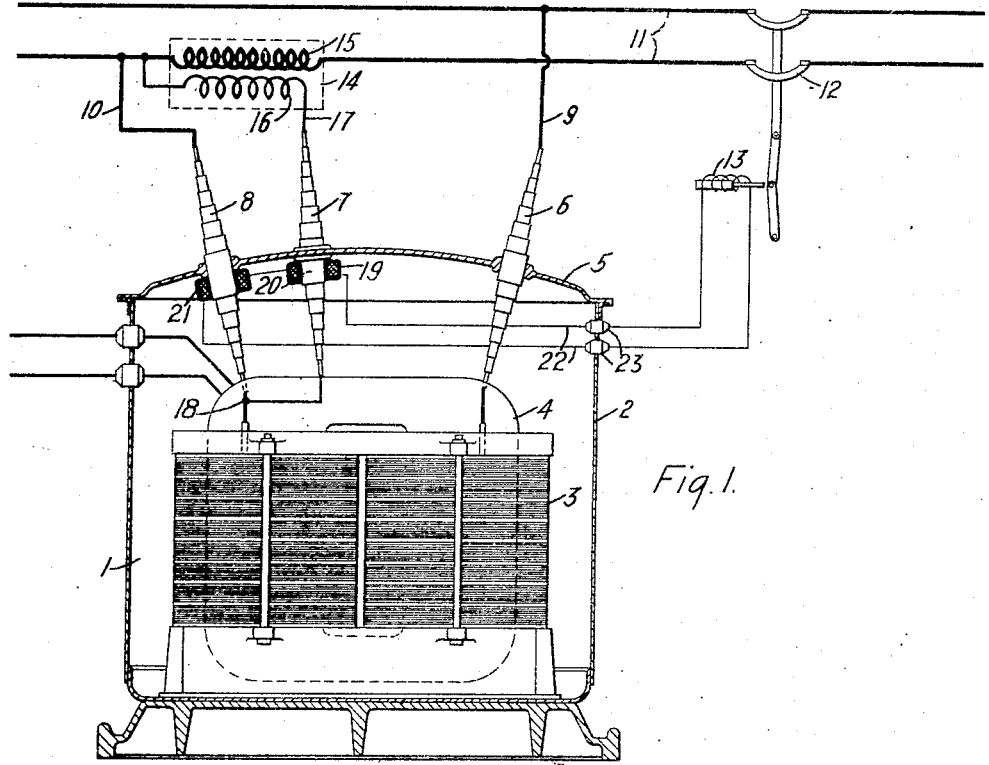

A. P. BENDER.
PROTECTIVE SYSTEM FOR TRANSFORMERS.
APPLICATION FILED DEC. 29, 1915.

1,251,738.

Patented Jan. 1, 1918.

WITNESSES:
Fred A. Lind.
Geo. W. Hansen.

INVENTOR
Allan P. Bender
BY
Wesley G. Carr
ATTORNEY

UNITED STATES PATENT OFFICE.

ALLAN P. BENDER, OF WILKINSBURG, PENNSYLVANIA, ASSIGNOR TO WESTINGHOUSE ELECTRIC AND MANUFACTURING COMPANY, A CORPORATION OF PENNSYLVANIA.

PROTECTIVE SYSTEM FOR TRANSFORMERS.

1,251,738.  Specification of Letters Patent.   Patented Jan. 1, 1918.

Application filed December 29, 1915.  Serial No. 69,193.

*To all whom it may concern:*

Be it known that I, ALLAN P. BENDER, a citizen of the United States, and a resident of Wilkinsburg, in the county of Allegheny and State of Pennsylvania, have invented a new and useful Improvement in Protective Systems for Transformers, of which the following is a specification.

My invention relates to electrical protective devices and particularly to means for protecting electrical apparatus that may be associated with high-potential circuits in which the power currents normally obtaining are of small values only.

More particularly, my invention refers to means for providing adequate currents to actuate relays, circuit breaker trip devices, meters, etc., in a high-voltage power system of the above-mentioned character.

In high-potential power systems, the cost of the switching equipment, such as the circuit breakers, etc., is very high. The cost of the usual protective devices associated with the switching equipment is likewise large, and when the power currents normally obtaining in the system are of extremely low values, the operation of such devices is unreliable. This latter condition is met in sub-station installations that are adapted to supply small quantities of power only. It will be appreciated that a system operating at a high voltage requires load currents of relatively low values only for delivering substantially large amounts of power.

For the automatic operation of the switching equipment of such sub-stations, the low-potential currents utilized for the trip coils have heretofore been provided by means of current transformers which, of necessity, were of extremely high cost. These current transformers comprised a primary winding having the potential of the high-potential system and a secondary winding which was thoroughly insulated from the primary circuit for furnishing the low-voltage operating currents to the trip coils and other protective devices. In sub-station installations of small power capacity, the cost of the current-transformer equipment of the character above mentioned was almost prohibitive. Again, the current flow through the primary windings of such current transformers was relatively low which affected the accuracy and reliability of the current flow in the secondary winding.

It has been proposed to substitute for these expensive current transformers, transformers of the nature of those employed in connection with bus-bars. These last named transformers comprise secondary windings usually wound upon magnetizable core members which, in turn, are slipped over the bus bars, the latter constituting the primary windings of the transformers. The modification proposed is to employ such a core member and secondary winding in connection with a high-potential bushing, the high-potential lead conducting the power currents of small value being threaded through the bushing and constituting the primary winding of the transformer. The objection to this scheme, however is that, unless the high-tension power current approximates 100 amperes or thereabout, the current induced in the secondary winding is not of sufficiently high value to effect reliable operation of the tripping mechanisms of the breakers or other auxiliary devices employed for protecting the power system and actuated by this induced current.

From the foregoing description, it is apparent that it is desirable to provide means for securing currents of high value in order to justify the use of current transformers constructed in accordance with the aforementioned method. To this end, my invention is adapted whereby I provide a current transformer embodying a high-potential bushing and a secondary coil embracing the same, which transformer will be reliable in operation and inexpensive to construct and, at the same time, provide means for securing adequate low-potential currents for operating, in a reliable manner, the trip mechanisms of the protective devices or other apparatus associated with the high-potential system.

Figure 2:
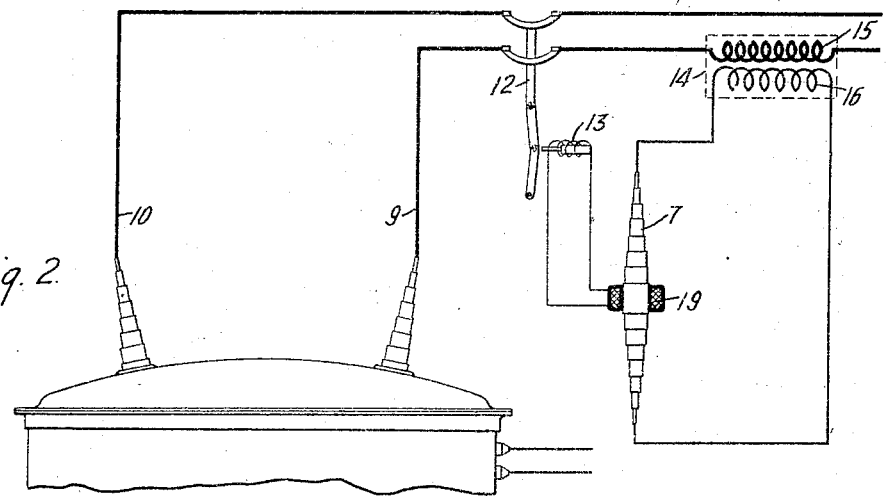

For a better understanding of the nature and scope of my invention, reference may be had to the following description and the accompanying drawing in which Figure 1 is a diagrammatic representation of a transmission system embodying a form of my invention, and Fig. 2 represents a modified form of the system shown in Fig. 1.

Referring to Fig. 1, a high-potential power transformer 1 comprises a containing case 2 in which is positioned a core member 3 and coils 4 that constitute the transforming device. The containing case 2 is provided with a cover 5 through which project insulating bushings 6, 7 and 8. The bushings 6 and 8 embrace high-potential leads 9 and 10, respectively, of the transformer coils 4 whereby the latter may be connected to the high-potential transmission circuit comprising mains 11. It is assumed that the power capacity of the transformer 1 is moderate, and that the voltage impressed thereupon by the mains 11 is of the order of 100,000 volts or thereabout or in excess of this value. In consequence thereof, the values of the power currents normally traversing the mains 11 may be substantially small; for example, 2 to 10 amperes.

A switch 12, which may be of any suitable construction for disconnecting high-potential mains from circuit, is provided with a trip coil 13 in order that the transformer 1 may be automatically disconnected from circuit when a short circuit occurs upon the system. It is necessary, therefore, to supply an adequate current of a safe potential to the solenoid 13 in order to insure the reliable operation of the switch 12. Of course, the operating mechanism of the switch 12 must not be subjected to extremely high-potentials, inasmuch as it is exposed and subject to come in contact with an operator.

I desire to employ a current transformer utilizing a high-potential bushing 7 and a secondary coil thereby forming a structure similar to the well known bus-bar type transformer, as indicated above. It is essential, therefore, that I obtain a primary alternating current of high value for inducing, in this secondary winding, an adequate current to insure the automatic operation of the switch 12. A current transformer 14 comprising a primary winding 15 of a relatively large number of turns and a secondary winding 16 of a relatively small number of turns, is employed, the primary winding 15 thereof being connected in series circuit with one of the high-potential mains 11 and, therefore, with the lead 10.

The secondary winding 16 likewise has one of its terminals connected to the high-potential lead 10, a small amount of insulation only being necessary for maintaining the primary winding 15 and the secondary winding 16 electrically independent of each other. The other terminal of the secondary winding 16 is connected to a conductor 17 which is threaded through the auxiliary bushing 7 and is connected, at the lower end thereof, to the high-potential lead 10 at a point indicated at 18. It will be noted, therefore, that the secondary winding 16 is charged to the potential of the primary winding 15 or that of the high-tension transmission circuit. Again, a local circuit is formed comprising the secondary winding 16, the conductor 17 and the high-potential lead 10. The relation between the turns of the windings of the series transformer 14 is such that a current of the order of at least 100 amperes or thereabout is induced to flow in the aforesaid local circuit, a current of this value or its equivalent in ampere-turns, as shown by experiment, being desirable for inducing adequate currents in a secondary coil 19 which embraces the central portion of the high-potential bushing 7.

The secondary winding 19, which is under the inductive influences of the current flowing through the secondary winding 16 of the transformer 14, is wound upon a magnetizable core member 20 and may, in certain instances, be connected in series circuit with a similar secondary coil 21 embracing the high-potential bushing 8. The secondary coils 19 and 21 are connected, through leads 22 which project through insulating bushings 23, to the terminals of the trip coil 13. Consequently, the current supplied to the trip coil 13 will be of a low and safe potential but adequate to operate the tripping mechanism at all times.

The transformer 14 will be an inexpensive one to construct, inasmuch as the secondary winding 16 need not be thoroughly insulated from the primary winding 15 since the former is connected directly in circuit with the high-potential mains. The insulation of the high-potential winding 16 is effected by means of the insulating bushing 7 which may be similar to the insulating bushings 6 and 8. Moreover, the current induced in the winding 16 is of a sufficient amount to permit the use of the secondary coils 19 and 21 for supplying the low-potential current of relatively high value to the trip mechanism 13. While the insulating bushing 7 is shown as being supported by the tank cover 5, it may be supported in any suitable manner which will insure that the secondary winding 16 will be adequately insulated from all exposed electrical apparatus.

In Fig. 2, the insulating bushing 7 is separated from the transformer casing 2, and the local circuit comprising the secondary winding 16 of the transformer 14 is independent of the high-potential leads 9 and 10 of the transformer. However, the secondary winding 16 is not thoroughly insulated from the primary winding 15, the thorough insulation of the winding from the auxiliary electrical apparatus being effected through the bushing 7. The secondary coil 19, which is under the inductive influence of the alternating current flowing in the secondary winding 16, is connected in a closed circuit with the trip coil 13 of the switch 12.

From the foregoing description, it will be apparent that I have provided means for first generating a high-potential alternating current of high value from a high-potential alternating current of relatively low value and then employing this induced current to induce, in a thoroughly insulated circuit, a low-potential current of relatively high value which current may be employed with safety and reliability for operating auxiliary devices.

Many obvious modifications of the systems shown and described will be apparent to those skilled in the art, and I desire, therefore, that only such limitations shall be imposed as are indicated in the appended claims.

I claim as my invention:

1. The combination with a lead conducting a high-potential alternating current of low value, an insulating bushing surrounding said lead, a support for said bushing, and an auxiliary bushing likewise supported thereby, of a series transformer having a primary winding adapted for connection in circuit with said high-potential lead and a secondary winding connected in closed circuit with that portion thereof which is threaded through said bushing by means of a conductor threaded through said auxiliary bushing, and a secondary winding embracing at least one of said bushings in order to have induced therein a low-potential current of relatively high value.

2. The combination with a lead conducting a high-potential alternating current of low value, an insulating bushing surrounding a portion of said lead, a support for said bushing, and an auxiliary bushing supported thereupon, of a series transformer having a primary winding of a relatively large number of turns and a secondary winding of a relatively small number of turns, one terminal of both windings being connected to said high-potential lead, a conductor threaded through said auxiliary bushing and connecting said secondary transformer winding in a closed circuit with a portion of said high-potential lead, and a secondary coil embracing one of said bushings in order to be under the inductive influence of the current flowing through said secondary winding.

3. The combination with a high-potential electrical apparatus, insulating bushings surrounding the high-potential leads thereof, a support for said bushings, and an auxiliary bushing likewise supported thereby, of a series transformer having one terminal of both its primary and secondary windings connected to one of said high-potential leads, a conductor threaded through said auxiliary bushing and connecting the other terminal of said secondary winding to the primary lead connected to the first said terminal thereof, and a secondary coil under the inductive influence of the current flow in said secondary winding embracing said auxiliary bushing.

4. The combination with an electrical apparatus, insulating bushings surrounding the high-potential leads thereof, a support for said bushings, and an auxiliary insulating bushing likewise supported thereby, of a series transformer having a primary winding that is adapted for connection in series circuit with one of said high-potential leads and a secondary winding connected in closed circuit with that portion of the high-potential lead connected to said primary winding which is threaded in the insulating bushing by means of a conductor threaded through said auxiliary bushing, and a secondary coil subject to the influence of the current flow in said closed circuit embracing one of said bushings.

5. The combination with an electrical apparatus, a containing case therefor, and at least two insulating bushings projecting through said case one of which surrounds a high-potential lead extending from the apparatus, of a series transformer having a primary winding that is adapted to be connected in series with one of said high-potential leads and a secondary winding connected in series with a conductor threaded through the other insulating bushing which conductor, in combination with said secondary winding and the high-potential lead connected to said primary winding, constitutes a closed circuit of high current capacity, and a secondary winding embracing at least one of said insulating bushings and influenced by the current flow in said closed circuit.

In testimony whereof, I have hereunto subscribed my name this 22nd day of Dec. 1915.

ALLAN P. BENDER.